United States Patent
Depondt

(10) Patent No.: US 11,702,040 B2
(45) Date of Patent: Jul. 18, 2023

(54) WIPER DEVICE FOR A WINDSCREEN WIPER WITH A SPRAY FUNCTION

(71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/369,276

(22) Filed: Jul. 7, 2021

(65) Prior Publication Data
US 2022/0009451 A1  Jan. 13, 2022

(30) Foreign Application Priority Data
Jul. 7, 2020  (DE) .......................... 102020208477.7

(51) Int. Cl.
| | | |
|---|---|---|
| *B60S 1/38* | (2006.01) | |
| *B60S 1/52* | (2006.01) | |
| *B60S 1/46* | (2006.01) | |

(52) U.S. Cl.
CPC ............. *B60S 1/3862* (2013.01); *B60S 1/381* (2013.01); *B60S 1/524* (2013.01); *B60S 1/46* (2013.01)

(58) Field of Classification Search
CPC ........ B60S 1/3862; B60S 1/524; B60S 1/381; B60S 1/3415
USPC ......................................... 15/250.04, 250.32
See application file for complete search history.

(56) References Cited

U.S. PATENT DOCUMENTS

| | | | | |
|---|---|---|---|---|
| 3,896,519 A | * | 7/1975 | Pankow ............... | B60S 1/4006 15/250.32 |
| 9,669,805 B2 | * | 6/2017 | Caillot .................... | B60S 1/524 |
| 2016/0107615 A1 | * | 4/2016 | Young, III ............... | B60S 1/38 15/250.32 |

FOREIGN PATENT DOCUMENTS

| | | | |
|---|---|---|---|
| DE | 102004056835 | * | 6/2006 |
| FR | 2994144 | * | 8/2012 |
| FR | 2994147 A1 | | 2/2014 |
| WO | 2010006776 A1 | | 1/2010 |

* cited by examiner

*Primary Examiner* — Gary K. Graham
(74) *Attorney, Agent, or Firm* — Michael Best & Friedrich LLP

(57) ABSTRACT

A wiper device having a wiper arm and a wiper blade device, wherein the wiper blade device has a wiper strip, a spoiler, and a wiper blade, and wherein the wiper blade device furthermore has an adapter with a fluid inlet and two fluid outlets to conduct fluid into fluid channels of the spoiler. The adapter is of multi-part design such that the adapter has a first part, which has the fluid inlet, a first outlet region and a second outlet region. The first part furthermore has a deflection geometry for conducting a fluid entering the fluid inlet to the first outlet region and the second outlet region. The adapter furthermore has a second part and a third part, wherein the second part closes the first outlet region and has the first fluid outlet, and wherein the third part closes the second outlet region and has the second fluid outlet.

12 Claims, 7 Drawing Sheets

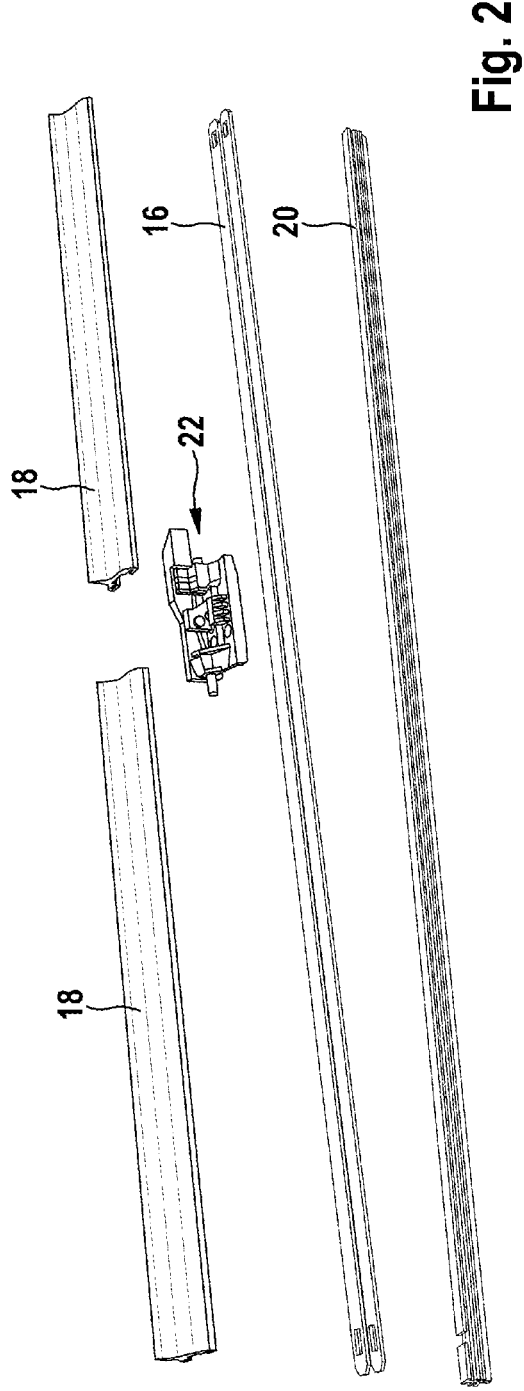
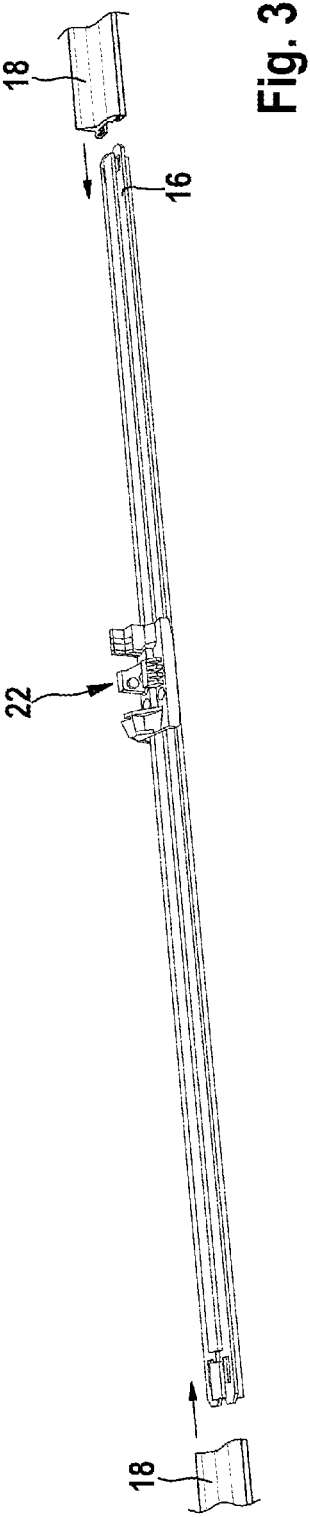

WIPER DEVICE FOR A WINDSCREEN WIPER WITH A SPRAY FUNCTION

BACKGROUND

The present invention relates to a wiper device for a windscreen wiper with a spray function. The present invention relates in particular to a wiper device which has a particularly advantageous connection and fixing of a wiper blade device to a wiper arm and a fluid supply.

Diverse embodiments of windscreen wipers for vehicles are known. It is also known to provide the windscreen wipers with a spray function such that cleaning fluid can be sprayed directly by the windscreen wiper onto a vehicle windscreen to be cleaned.

A wiper blade device for a wiper blade, with a wiper blade adapter, with at least one spoiler unit and at least one spray unit which has at least one washing fluid channel unit that at least partially forms a main longitudinal channel has already been proposed in this regard.

SUMMARY

The present invention relates to a wiper device for a windscreen of a vehicle, having a wiper arm and a wiper blade device, wherein the wiper blade device has a wiper strip, a spoiler which is fastenable thereto, and a wiper blade which is fastenable to the wiper strip or to the spoiler, and wherein the wiper blade device furthermore has an adapter which has a fluid inlet and two fluid outlets in order to conduct fluid introduced into the fluid inlet through the fluid outlets into fluid channels of the spoiler, wherein the adapter is of multi-part design in such a manner that the adapter has a first part, which has the fluid inlet, a first outlet region and a second outlet region, wherein the first part furthermore has a deflection geometry for conducting a fluid entering the fluid inlet to the first outlet region and the second outlet region, and wherein the adapter furthermore has a second part and a third part, wherein the second part closes the first outlet region and has the first fluid outlet, and wherein the third part closes the second outlet region and has the second fluid outlet.

A wiper device of this type permits, inter alia, a particularly simple and secure installation and removal of the wiper blade device.

The wiper device serves in particular for use for a windscreen wiper for a vehicle, such as in particular for a motor vehicle. The wiper device comprises a wiper arm and a wiper blade device. The wiper arm can serve in particular for mechanically connecting the wiper blade device to the motor vehicle and, for this purpose, is provided in particular to be fastened pivotably adjacent to a windscreen of the vehicle. Furthermore, the wiper arm can be driven in a manner known per se by the windscreen wiper motor. The wiper blade device is in particular that part of the wiper device or of the windscreen wiper which slides along a windscreen of the vehicle in a manner guided by the wiper arm.

For this purpose, the wiper blade device has a wiper strip, a spoiler which is fastenable thereto and a wiper blade which is fastenable to the wiper strip or to the spoiler. The wiper strip can be manufactured, for example, from metal and can provide the wiper blade device with mechanical stability. Furthermore, the wiper strip can serve to hold the spoiler and optionally the wiper blade. The spoiler serves in a manner known per se to press the windscreen wiper against the windscreen at high speeds in order thereby to permit a good wiper result. Furthermore, the spoiler can have channels for guiding cleaning fluid, as is described below in greater detail. The wiper blade comprises in particular a rubber lip which slides directly along the windscreen and thus removes fluid from the windscreen. The rubber lip or the wiper blade can be fastened to the spoiler, or else to the wiper arm.

With regard to operation of the windscreen wiper or of the wiper device, it may be preferred for the wiper device to be configured to spray cleaning fluid, such as, for example, water with a cleaning agent added, onto the windscreen. It can thereby be ensured that the windscreen is cleaned particularly effectively and above all rapidly of dirt. This is because spraying of the cleaning fluid onto the windscreen by the wiper device makes it possible for the cleaning fluid to be sprayed in a desired manner in an accurate position and extensively where the windscreen wiper is cleaning the windscreen. An application of the cleaning fluid to the windscreen by the wiper device thus permits improved reliability.

In order to make this possible, it is provided that the wiper blade device furthermore has an adapter which has a fluid inlet and two fluid outlets in order to conduct fluid introduced into the fluid inlet through the fluid outlets into fluid channels of the spoiler. A channel geometry or deflection geometry by which cleaning fluid can be conducted from the fluid inlet to the fluid outlets is thus provided within the adapter. The channel geometry can be configured here, for example by adaptation of the size ratios of corresponding channels, in such a manner that the cleaning fluid is distributed uniformly over the length of the spoiler or at least part of the wiper blade in order to ensure a uniform discharge of water and thus equally a uniform cleaning result over the length of the wiper blade.

Furthermore, the fluid inlet and the fluid outlets can have corresponding connections for coupling to the adjacent components.

It is furthermore provided that the adapter is of multi-part design. A multi-part structure is provided in such a manner that the adapter first of all has a first part which has the fluid inlet, a first outlet region and a second outlet region. The outlet regions here are those regions of the adapter which are provided adjacent to, in particular directly next to, corresponding outlets, such as, for example, connections of the adapter.

The first part furthermore comprises a deflection geometry by means of which cleaning fluid conducted into the fluid inlet can be conducted to the fluid outlets or first of all to the outlet regions. Since it is basically preferably provided that the fluid inlet is arranged in such a manner that cleaning fluid flows into the fluid inlet in a direction which does not lie parallel, but rather at an angle, to the main axis of the adapter, the conducting of the fluid comprises a deflection, which is possible by means of the deflection geometry. The deflection geometry thus serves to conduct the cleaning fluid in a suitable manner from the fluid inlet to the fluid outlets.

The adapter furthermore has a second part and a third part. The second part closes the first outlet region and has a first fluid outlet. The fluid outlet is in particular an opening and can be in particular part of a connection which can be connected to a fluid channel in the spoiler. It is accordingly provided that the third part closes the second outlet region and has the second fluid outlet. The fluid outlet is in turn in particular an opening and can be in particular part of a connection which can be connected to a fluid channel in the spoiler.

In particular, the multi-part structure configured as previously described for the adapter can result in advantages over the prior art. This is because it is thereby made possible for the adapter to be usable in a highly adaptable manner in different configurations of a windscreen wiper and in particular in various spoiler geometries. For this purpose, it can essentially be made possible for the main body of the adapter to be usable as standard and for only the second and the third part to be adapted to the surroundings of the windscreen wiper, for example by adaptation of size, geometry and/or position of the outlet.

Adaptation of the second and third part can thereby permit universal usability.

Furthermore, waste during production may possibly be prevented. This is because if damage occurs, for example, only in the region of the first, second or third part, it is possible to replace only this part. This can save costs in production.

Furthermore, it is possible to provide at least one of the second and third part, for example the second and the third part, depending on the application, with fluid nozzles for spraying out fluid in order to further improve the cleaning result. This can thus further improve the range of application and furthermore the adaptability along with an improved wiper result.

It can be preferred that the second part and the third part are fastened to the first part by a nonreleasable connection. Particularly great mechanical stability may possibly be achieved by the provision of a nonreleasable connection. Furthermore, the risk of a leakage can be kept particularly low. The risk of impairment of a desired operation that is stable over the long term can thereby be reduced in comparison to solutions from the prior art. Furthermore, in this configuration, an inadvertent release of the second or third part from the first part can be countered.

Examples of such a nonreleasable connection comprise, for example, a clip connection or a welded connection or an adhesively bonded connection. Such connections can ensure permanent fixing in a secure and reliable way and can be realized in a simple manner and using conventional methods. Furthermore, in particular adhesively bonded connections or welded connections are suitable for keeping the risk of a leakage particularly low.

It can furthermore be preferred that the adapter has a main axis which runs from the first fluid outlet to the second fluid outlet, and in that the deflection geometry runs on the main axis adjacent to the first fluid outlet and the second fluid outlet, and in that the deflection geometry comprises at least one further region in which the deflection geometry runs parallel to the main axis but differently therefrom. In this configuration, a deflection of the fluid can be realized even when there is little construction space, and therefore an effective and desired distribution of the cleaning fluid is permitted even in a small construction space.

Furthermore, it is of advantage that the second part and the third part have a fluid channel which lies completely on the main axis. In other words, the cleaning fluid is no longer deflected in the second and third part, but rather conducted via an axis through the second and third part. This permits a particularly simple construction of the second and third part. Furthermore, the second and the third part can be configured requiring little space.

It can preferably be provided that the wiper device has a connector which is fixable in particular pivotably to the adapter, and that the connector has a wiper arm receptacle in which the wiper arm is fixable. In this configuration, it can be made possible in a simple manner that the wiper blade device is fixed to the wiper arm and thus the windscreen wiper is installed. It can be possible in a simple manner that the wiper arm is pushed into the wiper arm receptacle and is fixed therein, for example to the connector or to the adapter, in particular by means of a releasable fixing.

For example, it can be preferred that the wiper arm is fixed in the wiper arm receptacle by a spring-pretensioned fixing element. For example, when the wiper arm is pushed into the wiper arm receptacle, the fixing element can be displaced by the wiper arm or a fixing region thereof counter to the spring force and, when the wiper arm is in its fixing position, can permit the fixing element, by means of an appropriately configured fixing geometry, to pass back into its fixing position by means of the spring force. In this position, the fixing element can block the wiper arm against leaving the wiper arm receptacle.

Such a configuration can in particular provide a fixing which can reliably prevent the risk of an inadvertent release of the wiper blade device. Furthermore, this connection is releasable in a simple manner for removal of the windscreen wiper. For example, for release of said fixing, the fixing element which is pretensioned by spring force can be pressed, by pressing the button, out of the fixing geometry of the wiper arm counter to the spring force in order to thereby release a fixing. The button can be, for example, part of the connector.

It can furthermore be preferred that the liquid inlet of the adapter is designed as a male connection. In this configuration, for example, a hose can be pushed onto the connection, which can further simplify the construction and installation and removal. Furthermore, it can be possible to connect a liquid supply, such as a hose, to the adapter via a corresponding intermediate piece. The intermediate piece can be connected to the connector or can be fixed thereto or else can be entirely independent thereof.

It can furthermore be preferred that the spoiler has a multiplicity of fluid nozzles for spraying out fluid. An application of the cleaning fluid to the windscreen of a vehicle can thereby be particularly uniform since the nozzles can be distributed on the spoiler in a simple manner. Furthermore, a simple construction or a simple configuration of the wiper blade device can thereby be made possible. This is because it is particularly preferred, as described above, for the spoiler to bear a channel for distributing the cleaning fluid, the channel being connected to the adapter or to the fluid outlets thereof.

BRIEF DESCRIPTION OF THE DRAWINGS

Further advantages and advantageous configurations of the subjects according to the invention are illustrated by the drawing and explained in the description below, wherein the features described can be the subject matter of the present invention individually or in any combination, unless the opposite is explicitly evident from the context. It should be noted here that the drawing is only descriptive in nature and is not intended to restrict the invention in any form. In the drawing

FIG. 2 shows a detailed view of parts of the configuration from FIG. 1 showing a construction of the wiper blade device;

FIG. 3 shows the detailed view from FIG. 2 in a partially installed state;

DETAILED DESCRIPTION

Figure 1:
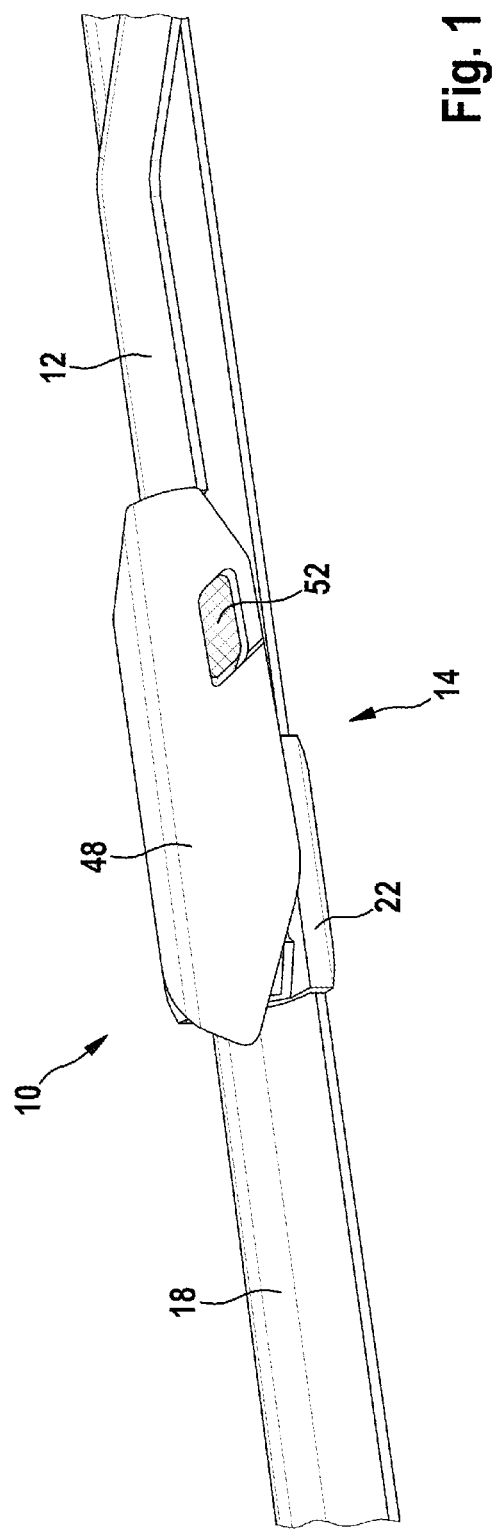
FIG. 1 shows a schematic illustration of a wiper device according to one configuration of the present invention.

FIG. 1 shows a configuration of a wiper device 10 according to the present invention. FIG. 1 here shows the wiper device 10 in an operating state or in an assembled state, and FIGS. 2 and 3 show the wiper device 10 in greater detail and in its individual parts and in an exploded view.

The wiper device 10 is used in particular for a windscreen wiper of a vehicle and can be installed as such on a vehicle adjacent to a windscreen.

It is shown that the wiper device 10 comprises a wiper arm 12 and a wiper blade device 14. With regard to the wiper blade device 14, it can furthermore be seen in particular in FIG. 2 that the latter has a wiper strip 16, a spoiler 18 which is fastenable thereto, and a wiper blade 20 which is fastenable to the wiper strip 16 or to the spoiler 18. It is furthermore provided that the wiper blade device 14 has an adapter 22 which has a fluid inlet 24 and two fluid outlets 26, 28 in order to conduct cleaning fluid introduced into the fluid inlet 24 through the fluid outlets 26, 28 into fluid channels 30 of the spoiler 18. This is shown in greater detail in the following figures.

FIG. 3 furthermore shows the basic construction of the wiper device 10. It is shown in detail that the adapter 22 can be pushed onto the wiper strip 16. Furthermore, the adapter 22 can be clipped or welded to the wiper strip 16. On both sides of the adapter 22, the spoiler 18, which is configured in two parts, can likewise be pushed or clipped onto the wiper strip 16 and can come into contact with the adapter 22, as is intended to be clarified by the arrows.

Figure 4:
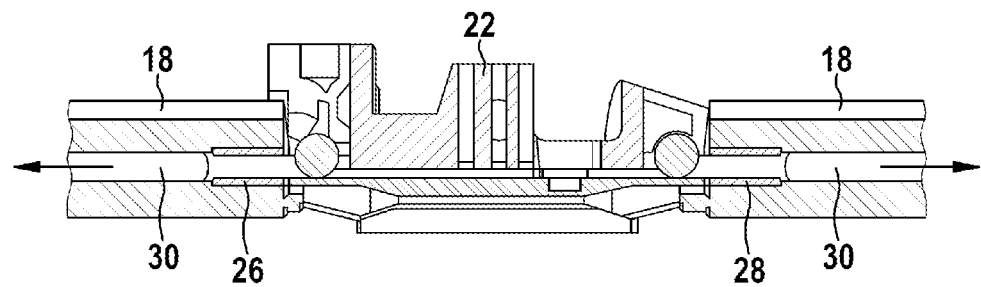
FIG. 4 shows a further detailed view from FIG. 2 in a partially installed state.

FIG. 4 shows a sectional detailed view of the adapter 22 with the fluid outlets 26, 28 which are connected to one part each of the spoiler 18 such that cleaning fluid can flow from the adapter 22 into the fluid channels 30 of the spoiler 18, as is intended to be clarified by the arrows.

Figure 5:
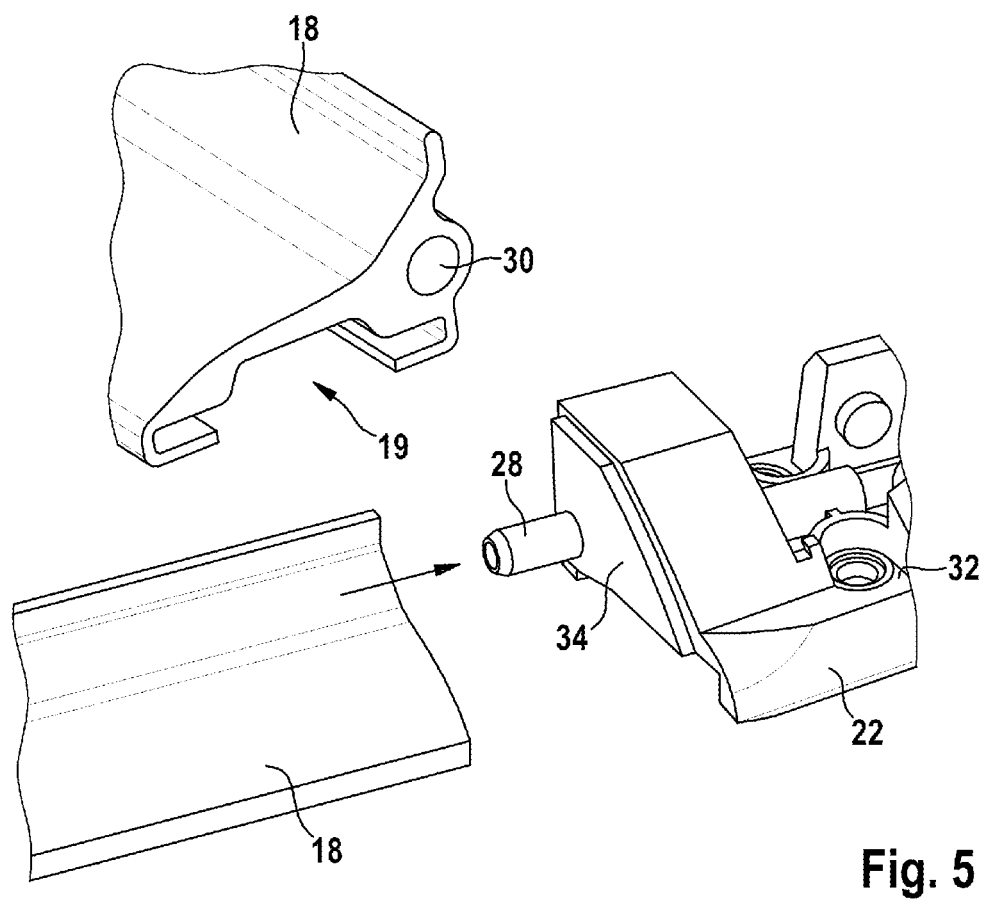
FIG. 5 shows a further detailed view of parts of the configuration from FIG. 1 showing an adapter for a wiper device with a spoiler.

This is shown in detail in FIG. 5 which shows a side view of the spoiler 18 with a fluid channel 30 which is arranged therein and can be connected to the fluid nozzles of the spoiler 18 and to the fluid outlet 28 of the adapter. Also shown is a fastening geometry 19 in which the wiper blade 20 can be fastened.

Figure 6:
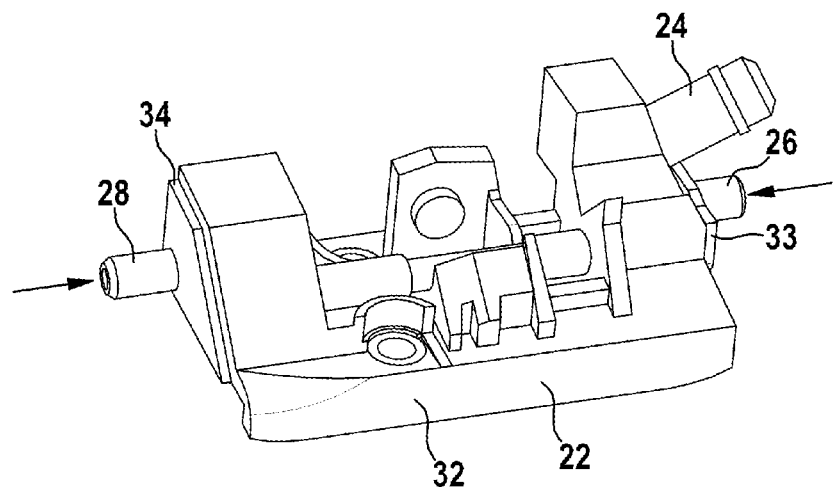
FIG. 6 shows a further detailed view of an adapter for a wiper device.
Figure 7:
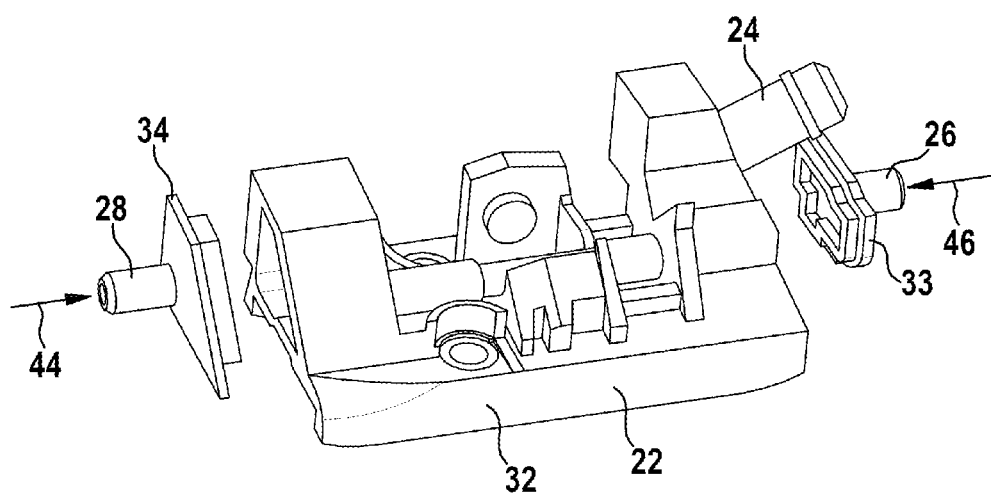
FIG. 7 shows a partial exploded illustration of the view from FIG. 6.

FIGS. 6 and 7 furthermore show that the adapter 22 is of multi-part design in such a manner that the adapter 22 has a first part 32, which has the fluid inlet 24, a first outlet region 36 and a second outlet region 38. It is furthermore shown that the adapter 22 also has a second part 33 and a third part 34, wherein the second part 33 closes the first outlet region 36 and has the first fluid outlet 26, and wherein the third part 34 closes the second outlet region 38 and has the second fluid outlet 28. It is furthermore indicated that the second part 33 and the third part 34 are fastened to the first part 32 by a nonreleasable connection, for example are connected, according to the figures shown, in particular by means of welding or adhesive bonding.

Figure 8:
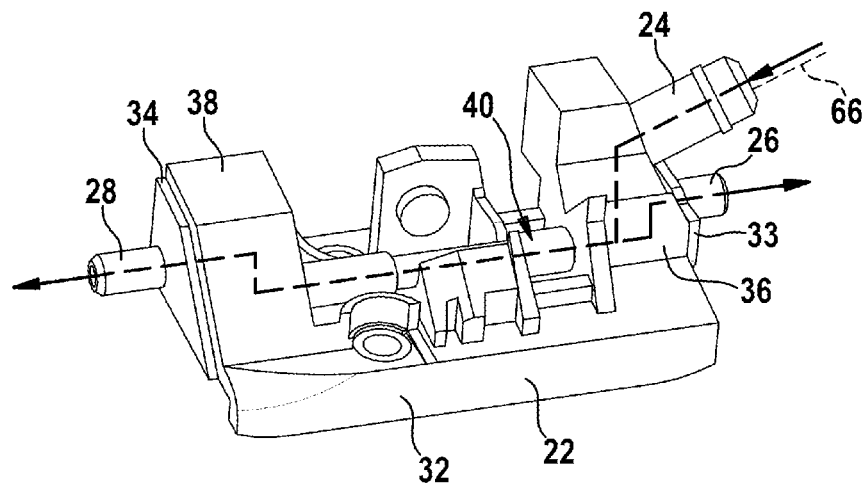
FIG. 8 shows a functional illustration of the adapter from FIG. 6 for a wiper device.
Figure 9:
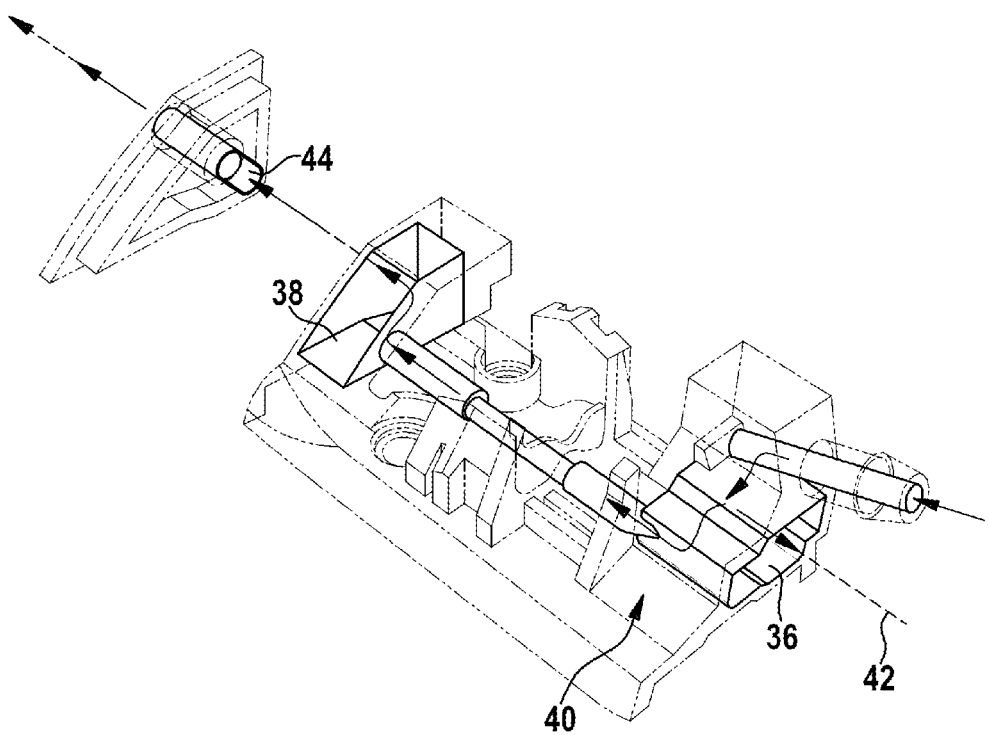
FIG. 9 shows a further functional illustration of the adapter from FIG. 6 for a wiper device.

The configuration of the adapter 22 or of the first part 32 for conducting the cleaning fluid is shown in greater detail in FIGS. 8 and 9. It is indicated in these figures that the first part 32 furthermore has a deflection geometry 40 for conducting or for deflecting a fluid entering the fluid inlet 24 to the first outlet region 36 and the second outlet region 38. It is shown in greater detail that the adapter 22 has a main axis 42 which runs from the first fluid outlet 26 to the second fluid outlet 28, and that the deflection geometry 40 runs on the main axis 42 adjacent to the first fluid outlet 26 and the second fluid outlet 28. Furthermore, it is provided that the deflection geometry 40 comprises at least one further region 44 in which the deflection geometry 40 runs parallel to the main axis 42, but differently therefrom. The cleaning fluid is therefore diverted in particular in the first part 32 of the adapter 22.

With regard to the second part 33 and the third part 34, it is provided, by contrast, that they have a fluid channel 44, 46 that lies completely on the main axis 42. In other words, the cleaning fluid flows through the second part 33 and third part 34 without being deflected.

It is furthermore shown that an axis 66 defined by the fluid inlet 24 lies at an angle, which can be, for example, 10, to the main axis 40.

Figure 10:
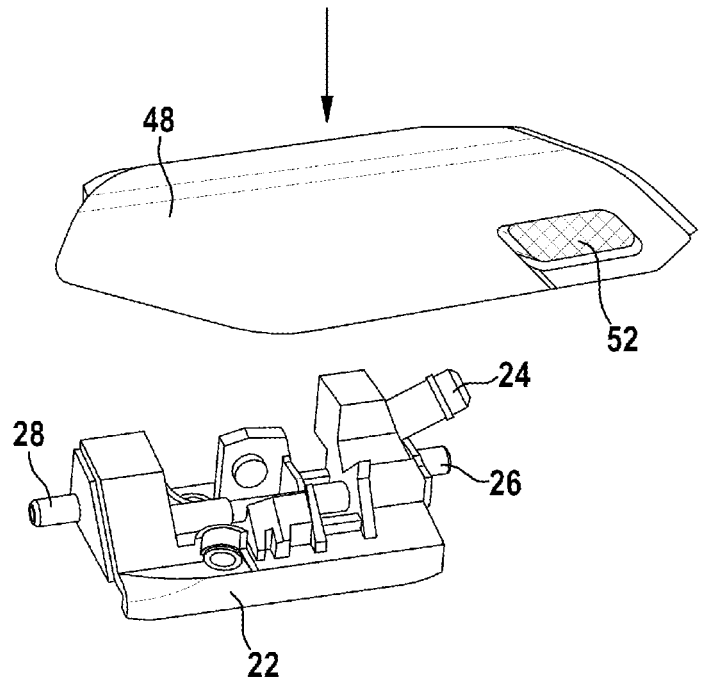
FIG. 10 shows a view of the adapter with a connector in a non-installed state.
Figure 11:
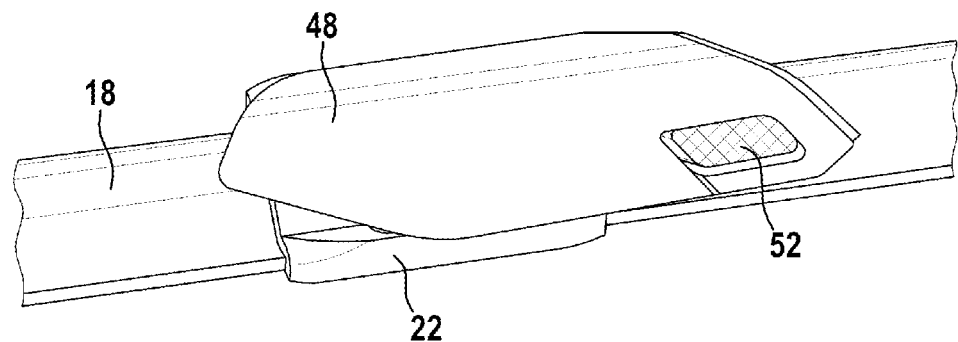
FIG. 11 shows a view of the adapter with a connector from FIG. 10 in an installed state.
Figure 12:
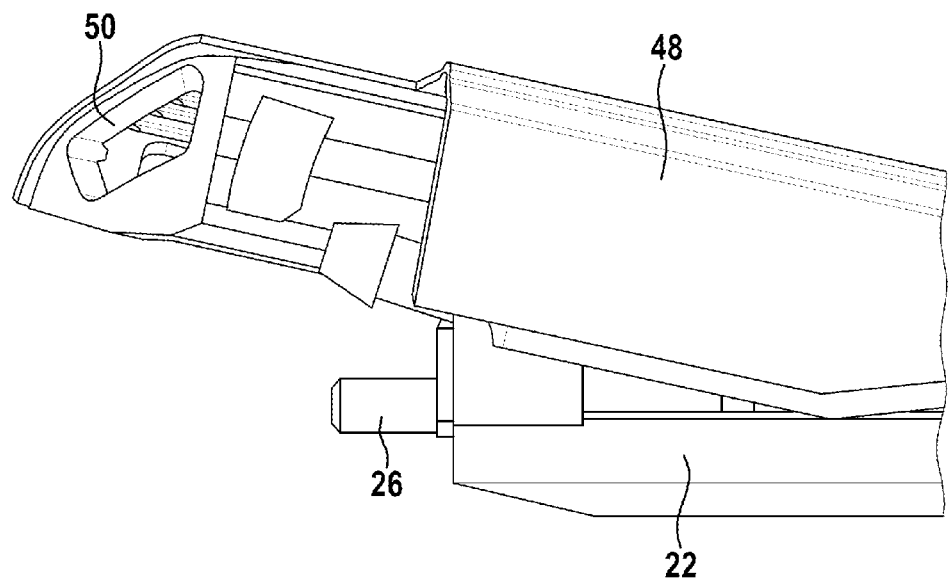
FIG. 12 shows a further view of the adapter with a connector from FIG. 10 in an installed state.

It is furthermore shown in FIGS. 10 to 12 that the wiper device 10 has a connector 48 which is fixable to the adapter 22. The connector 48 furthermore comprises a wiper arm receptacle 50 in which the wiper arm 12 is fixable. In particular, it can preferably be provided in this regard that the wiper arm 12 is fixed in the wiper arm receptacle 50 by a spring-pretensioned fixing element. For example, for releasing said fixing, the fixing element which is pretensioned by spring force can be pressed, by pressing of a button 52, out of the fixing geometry of the wiper arm 12 counter to the spring force in order to thereby release a fixing. The fixing geometry is shown, for example, in FIG. 3. The button 52 can be, for example, part of the connector 48, as is shown in FIGS. 10 to 12.

The invention claimed is:

1. A wiper device (10) for a windscreen of a vehicle, the wiper device (10) having a wiper arm (12) and a wiper blade device (14), wherein the wiper blade device (14) has a wiper strip (16), a spoiler (18) which is fastenable thereto, and a wiper blade (20) which is fastenable to the wiper strip (16) or to the spoiler (18), and wherein the wiper blade device (14) furthermore has an adapter (22) which has a fluid inlet (24) and first and second fluid outlets (26), (28) to conduct fluid introduced into the fluid inlet (24) through the fluid outlets (26, 28) into fluid channels (30) of the spoiler (18), characterized in that the adapter (22) is of multi-part design in such a manner that the adapter (22) has a first part (32), which has the fluid inlet (24), a first outlet region (36) and a second outlet region (38), wherein the first part (32) furthermore has a deflection geometry (40) for conducting a fluid entering the fluid inlet (24) to the first outlet region (36) and the second outlet region (38), and wherein the adapter (22) furthermore has a second part (33) and a third part (34), wherein the second part (33) closes the first outlet region (36) and has the first fluid outlet (26), and wherein the third part (34) closes the second outlet region (38) and has the second fluid outlet (28), wherein the adapter (22) has a main axis (42) which runs from the first fluid outlet (26) to the second fluid outlet (28), and in that the deflection geometry (40) comprises a first region that runs on the main axis (42) adjacent to the first fluid outlet (26), a second region, spaced from the first region, that runs on the main axis (42) adjacent to the second fluid outlet (28), and a third region that runs parallel to the main axis (42) but offset therefrom, wherein the deflection geometry (40) includes a fourth region that extends directly between the first region and the third region along a direction that extends at a non-zero angle relative to both the main axis (42) and the third region, and a fifth region that extends directly between the first region and the third region along a direction that extends at a non-zero angle relative to both the main axis (42) and the third region.

2. The wiper device (10) according to claim 1, characterized in that the second part (33) and the third part (34) are fastened to the first part (32) by a nonreleasable connection.

3. The wiper device (10) according to claim 2, characterized in that the second part (33) and the third part (34) are connected to the first part (32) by a clip connection or by welding or adhesive bonding.

4. The wiper device (10) according to claim 1, characterized in that the second part (33) and the third part (34) have a fluid channel (44) which lies completely on the main axis (42).

5. The wiper device (10) according to claim 1, characterized in that the wiper device (10) has a connector (48) which is fixable to the adapter (22), and in that the connector (48) has a wiper arm receptacle (50) in which the wiper arm (12) is fixable.

6. The wiper device (10) according to claim 5, characterized in that the wiper arm (12) is fixed in the wiper arm receptacle (50) by a spring-pretensioned fixing element.

7. The wiper device (10) according to claim 1, characterized in that the fluid inlet (24) of the adapter (22) is a male connection.

8. The wiper device (10) according to claim 1, characterized in that at least one of the second part (33) and the third part (34) has a fluid nozzle for spraying out fluid.

9. The wiper device (10) according to claim 1, characterized in that the spoiler (18) has a multiplicity of fluid nozzles for spraying out fluid.

10. The wiper device (10) according to claim 1, characterized in that the adapter (22) has a main axis (42) which runs from the first fluid outlet (26) to the second fluid outlet (28), wherein the adapter (22) permits fluid flow into the deflection geometry (40), wherein a portion of the deflection geometry (40) runs parallel to the main axis (42) but offset therefrom, wherein the deflection geometry (40) is arranged such that fluid is configured to flow from the fluid inlet (24) and into the deflection geometry (40), and then from the deflection geometry (40) and into the first fluid outlet (26) or the second fluid outlet (28).

11. The wiper device (10) according to claim 1, wherein the second fluid outlet (28) is configured to be inserted into one of the fluid channels (30).

12. The wiper device (10) according to claim 1, wherein the fourth region extends perpendicularly between the first region and the third region, and wherein the fifth region extends perpendicularly between the second region and the third region.

* * * * *